Oct. 23, 1951  W. GABOR  2,572,608
ARTIFICIAL FISH BAIT
Filed Feb. 20, 1950
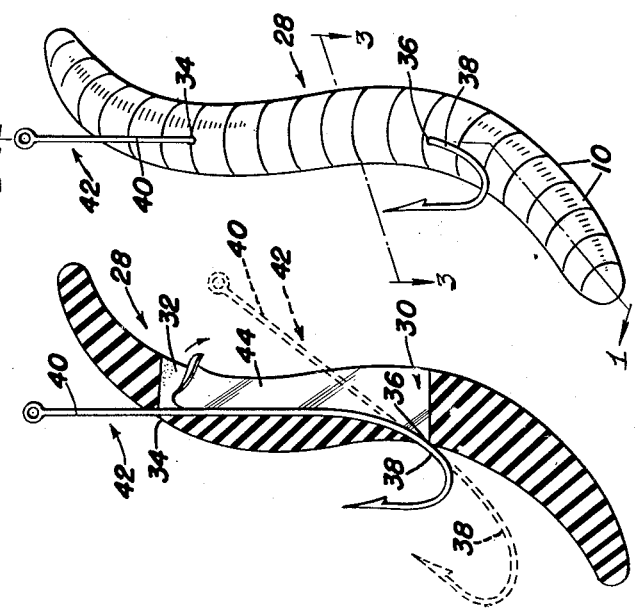
William Gabor
INVENTOR.

Patented Oct. 23, 1951

2,572,608

UNITED STATES PATENT OFFICE 2,572,608

ARTIFICIAL FISH BAIT

William Gabor, Milton, Mass.

Application February 20, 1950, Serial No. 145,128

2 Claims. (Cl. 43—42.1)

The present invention relates to certain new and useful improvements in fish bait and has more particular reference to an artificial worm.

The salient object of this invention is to enable fishermen to wholly dispense with the use of live worms. It is a matter of common knowledge that live angler's worms are not only exasperating to handle but are dangerous, even to the skilled fishermen, when they are applied to a fishhook. Many cuts and snags on one's fingers have to be contended with, as is well known. Then, too, the bare soft body of the worm is repeatedly nibbled from the hook unknown, of course, to the fisherman. This makes it necessary for the fisherman, before each strike, to pull in his line and check the hook to see if the worm is still there and securely lodged in place. Manifestly, these well known painstaking steps result in aggravation and a loss of much and valuable time.

What is more, live worms are given to the spread of obnoxious odors and, what with the filth attending same, are unsanitary to use. Fishermen with cut fingers and broken fingernails often pick up stubborn infections, making the handling of real worms highly objectionable and often painfully expensive.

It has been discovered that an artificial worm, properly manufactured, sized and shaped, provides an adequate and satisfactory fishing bait. Therefore, it is the object of the present invention to provide an artificial worm which is made of commercial plastics or from proper grades of compressively resilient rubber which are clean and handy to use, which lasts longer and gives better all around results, much to the enjoyment of the fisherman.

One phase of the invention has to do with a pliant, substantially indestructible artificial worm which resembles in shape and life-like properties a real live worm and which is characterized by an elongated body of compressively resilient rubber having its exterior surface cured and non-sticky and provided with an elongated slit opening through one side of said body, the walls of said slit being composed of sticky uncured self-healant rubber, said slit providing a self-sealing groove for reception and anchored retention of the shank portion of a conventional fishhook.

Somewhat more specifically, novelty is predicated on a distinct and different artificial worm which is characterized by an elongated body of compressively resilient rubber having its exterior surface cured and non-sticky and provided with an elongated slit opening through one side of said body, the walls of said slit being composed of sticky uncured self-healant rubber, said slit providing a self-sealing pocket having holes at its respective ends, said holes opening through that side of the body diametrically opposite to said one side of the latter, and a fishing hook having a shank portion with an eye at one end and a hook at the other end, the major portion of said shank being lodged and sealed in said pocket with the eye-equipped end projecting through and beyond one of said holes and the hook projecting through and outwardly of said body by way of the remaining hole.

Other objects and advantages will become more readily apparent from the following description and the accompanying illustrative drawings.

In the accompanying sheet of drawings, wherein like numerals are employed to designate like parts throughout the views:

Figure 1 is a longitudinal sectional view taken on the plane of the line 1—1 of Figure 2, looking in the direction of the arrows and showing a normally open pocket and fish hook and the manner in which the latter is placed in position by the purchaser;

Figure 2 is an elevational view of the form of worm seen in Figure 1; and,

Figure 3 is a central cross-section on the line 3—3 of Figure 2, looking in the direction of the arrows and showing the covering means removed and walls of the pocket sealed.

In Figures 1 to 3, singly and collectively considered, the worm is denoted by the numeral 28, and is of appropriate rubber or commercial plastics, of desired color, and is provided with a hook receiving and accommodating pocket 30. Whereas the exterior surfaces of the main body are cured and non-sticky, the walls 32 of the pocket are of non-cured, sticky self-healant rubber. At the ends of the pocket suitable openings 34 and 36 are provided for passage of the shank and eye end portions 38 and 40 of the fish hook 42. The manner of making the pocket self-sealing may vary in the finally manufactured product, as is obvious. Then, too, a suitable removable covering or protector 44 may be necessary and this can be peeled off prior to inserting the shank of the extra hook and then sealing the pocket to keep the hook in place. This form of bait or "worm" is to be sold without the hook and the hook is thereafter put in position in the manner shown and the pocket is then sealed to assure proper maintenance of the hook.

It is within the scope of this invention to make the worm of compressibly resilient rubber of an appropriate grade, of commercial plastics of suitable plasticity and pliant properties or any equivalent material thought to be appropriate for practical utility. Exteriorly, the worm is shown formed with annular longitudinally spaced lines 10 simulating the usual contractable ribs.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. As a new article of manufacture, an artificial worm comprising an elongated body of compressively resilient rubber having its exterior surface cured and non-sticky and provided with an elongated slit opening through one side of said body, the walls of said slit being composed of sticky uncured self-healant rubber, said slit providing a self-sealing groove for reception and anchored retention of the shank portion of a conventional fishhook.

2. As a new article of manufacture, an artificial worm comprising an elongated body of compressively resilient rubber having its exterior surface cured and non-sticky and provided with an elongated slit opening through one side of said body, the walls of said slit being composed of sticky uncured self-healant rubber, said slit providing a self-sealing pocket having holes at its respective ends, said holes opening through that side of the body diametrically opposite to said one side of the latter, and a fishing hook having a shank portion with an eye at one end and a hook at the other end, the major portion of said shank being lodged and sealed in said pocket with the eye-equipped end projecting through and beyond one of said holes and the hook projecting through and outwardly of said body by way of the remaining hole.

WILLIAM GABOR.

REFERENCES CITED

The following references are of record in the file of this patent:

UNITED STATES PATENTS

| Number | Name | Date |
|---|---|---|
| 1,846,538 | Albers et al. | Feb. 23, 1932 |
| 2,306,181 | Newman | Dec. 22, 1942 |